(12) United States Patent
Korn et al.

(10) Patent No.: US 6,374,278 B1
(45) Date of Patent: Apr. 16, 2002

(54) METHOD AND APPARATUS FOR THE GENERATION OF STATISTICALLY RANDOM NUMBERS

(75) Inventors: Rodney A. Korn, Woodinville; Vu X. Nguyen, Seattle, both of WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/276,366

(22) Filed: Mar. 25, 1999

(51) Int. Cl.[7] .................................................. G06F 1/02
(52) U.S. Cl. ...................................................... 708/250
(58) Field of Search ................................. 708/250–256

(56) References Cited

U.S. PATENT DOCUMENTS

| | | | |
|---|---|---|---|
| 3,790,768 A | 2/1974 | Chevalier et al. ............ | 708/251 |
| 4,270,430 A | 6/1981 | Deutsch ........................ | 84/608 |
| 4,327,419 A | 4/1982 | Deutsch et al. .............. | 708/250 |
| 4,355,366 A * | 10/1982 | Porter ........................... | 708/255 |
| 4,545,024 A * | 10/1985 | Maher et al. ................. | 708/255 |
| 4,694,412 A | 9/1987 | Domenik et al. ............. | 708/251 |
| 4,791,594 A | 12/1988 | Harney et al. ................ | 708/254 |
| 4,810,975 A | 3/1989 | Dias .............................. | 331/78 |
| 4,855,690 A | 8/1989 | Dias .............................. | 331/78 |
| 5,007,087 A | 4/1991 | Bernstein et al. ............. | 380/46 |
| 5,218,559 A | 6/1993 | Angebaud et al. ........... | 708/250 |
| 5,627,775 A * | 5/1997 | Hong et al. ................... | 708/250 |
| 5,706,218 A | 1/1998 | Hoffman ....................... | 708/251 |
| 6,195,669 B1 * | 2/2001 | Onodera et al. .............. | 708/250 |

* cited by examiner

*Primary Examiner*—David H. Malzahn
(74) *Attorney, Agent, or Firm*—Blakely, Sokoloff, Taylor & Zafman LLP

(57) ABSTRACT

A digital platform comprises a peripheral and a processing unit. The peripheral produces noise source data that is used by the processing unit to produce a statistically random data stream. In particular, a run-length coding scheme is performed on digitally sampled noise source data to produce a plurality of runs, each run having a count and a pattern value. Then, an intermediary data stream based on the count of each run of the plurality of runs is formed. An anti-biasing scheme is performed on the intermediary data stream to remove bias and produce a statistically random data stream.

27 Claims, 5 Drawing Sheets

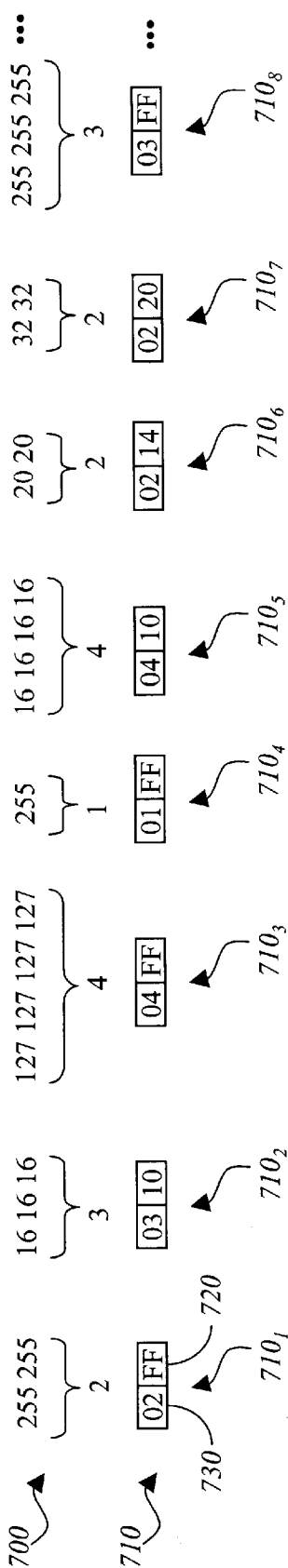
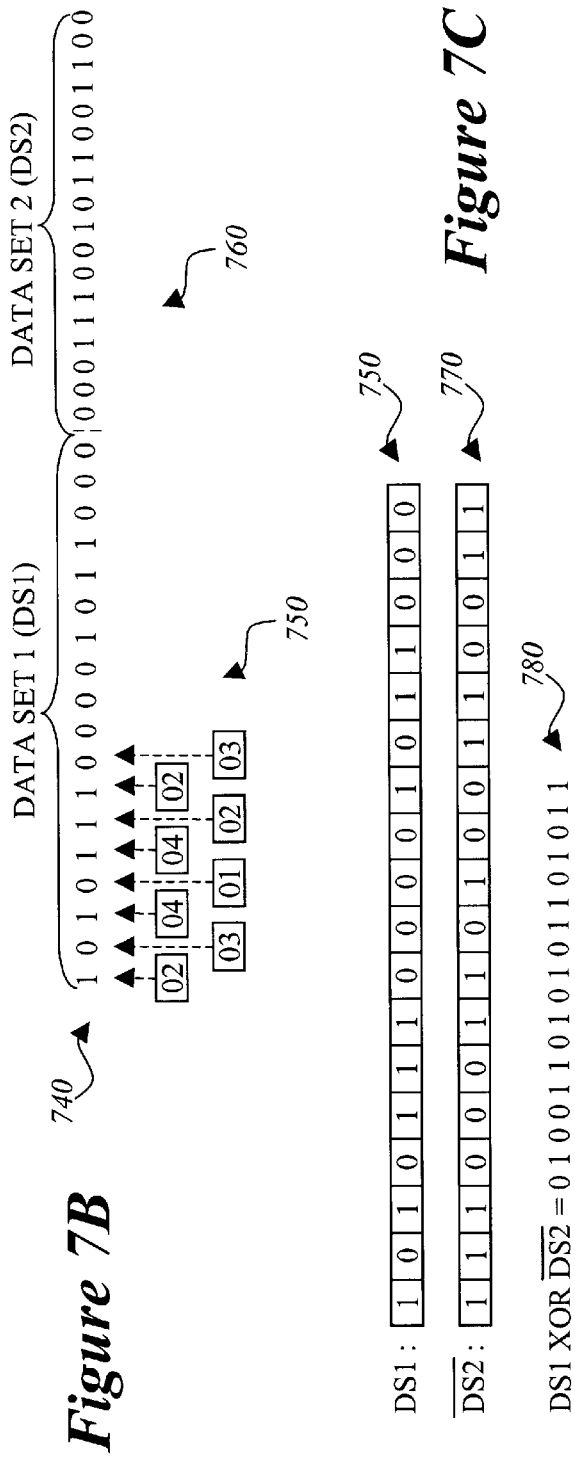
*Figure 7A*
*Figure 7B*
*Figure 7C*

METHOD AND APPARATUS FOR THE GENERATION OF STATISTICALLY RANDOM NUMBERS

BACKGROUND

1. Field

The invention relates to the field of random number generation. In particular, the present invention relates to a method and platform for generating a statistically random stream of data using standardized hardware.

2. Background

Random numbers are useful for a variety of different applications. For example, a sequence of random numbers may be used as input data for computer simulations. Also, random numbers are utilized for cryptography, namely for the encryption and decryption of data.

In an attempt to produce random numbers, many legacy computers have employed pseudo random number generators to produce a sequence of bits. While the bit sequence appears to be random, it is merely periodic with an infrequent periodicity. The disadvantage associated with pseudo random number generators is that they are susceptible to reverse engineering techniques to uncover patterns in the number generation. Thus, there is a risk that any cryptographic operations utilizing pseudo-random numbers are not truly secure. Also, systems employing pseudo random number generators normally are not compliant with federal security levels set forth in a Federal Information Processing Standards publication entitled "Security Requirements for Cryptographic Modules") published Jan. 11, 1994 (FIPS PUB 140-1).

With continual advancement of technology, computers are being implemented with new circuit board architectures having random number generators employed thereon. Unlike pseudo random number generators, these random number generators are specialized circuits providing statistically random sequences of bits. For example, there currently exists specially designed random number generators that receive source data from a thermal noise source and outputs resultant random data. However, the use of special hardware fails to support random number generation for legacy computers and other digital platforms unless additional hardware is purchased and installed.

Hence, it would be desirable to provide a statistically random data stream by simply using hardware normally found in most legacy and future generation computers.

SUMMARY OF THE INVENTION

Briefly, one embodiment of the present invention relates to a digital platform comprising a peripheral to produce noise source data and a processing unit to produce a statistically random data stream based on the noise source data provided by the peripheral. The processing unit is coupled to the peripheral.

BRIEF DESCRIPTION OF THE DRAWINGS

The features and advantages of the present invention will become apparent from the following detailed description of the present invention in which:

FIGS. 7A–7C are diagrams of an illustrative example of the run-length coding scheme, the run-count encoding scheme and an anti-biasing scheme performed on an input bit stream.

DETAILED DESCRIPTION

In brief, the present invention relates to a random number generator formed with standardized hardware to generate statistically random numbers, along with a particular method of generation. In the following description, numerous specific details are set forth in order to provide a thorough understanding of the present invention. It will be obvious to one skilled in the art, however, that the present invention may be practiced without these specific details.

Herein, a number of terms and symbols are frequently used to describe certain hardware and characteristics. For example, a "digital platform" includes hardware capable of processing information. Examples of a digital platform include, but are not limited or restricted to a computer (e.g., a laptop, desktop, hand-held, server, mainframe, etc.), imaging equipment (e.g., printer, facsimile machine, etc.), or even a set-top box (cable box or network computer, etc.). A "bus" is broadly defined as one or more information-carrying mediums such as, for example, electrical wire, bus trace, fiber optic, or a wireless communication channel (e.g., infrared "IR" link or radio frequency "RF" link).

In addition, "information" includes data, control, addresses or any combination thereof. A "random number" comprises a predetermined number of bits that can be computed from its binary form into decimal or hexadecimal numbers. The symbol "H" represents a hexadecimal number. A "data stream" is a continuous series of information being transferred or intended for transfer in analog or digital form. A "run" comprises a pattern of consecutive bits in a data stream.

Figure 1:
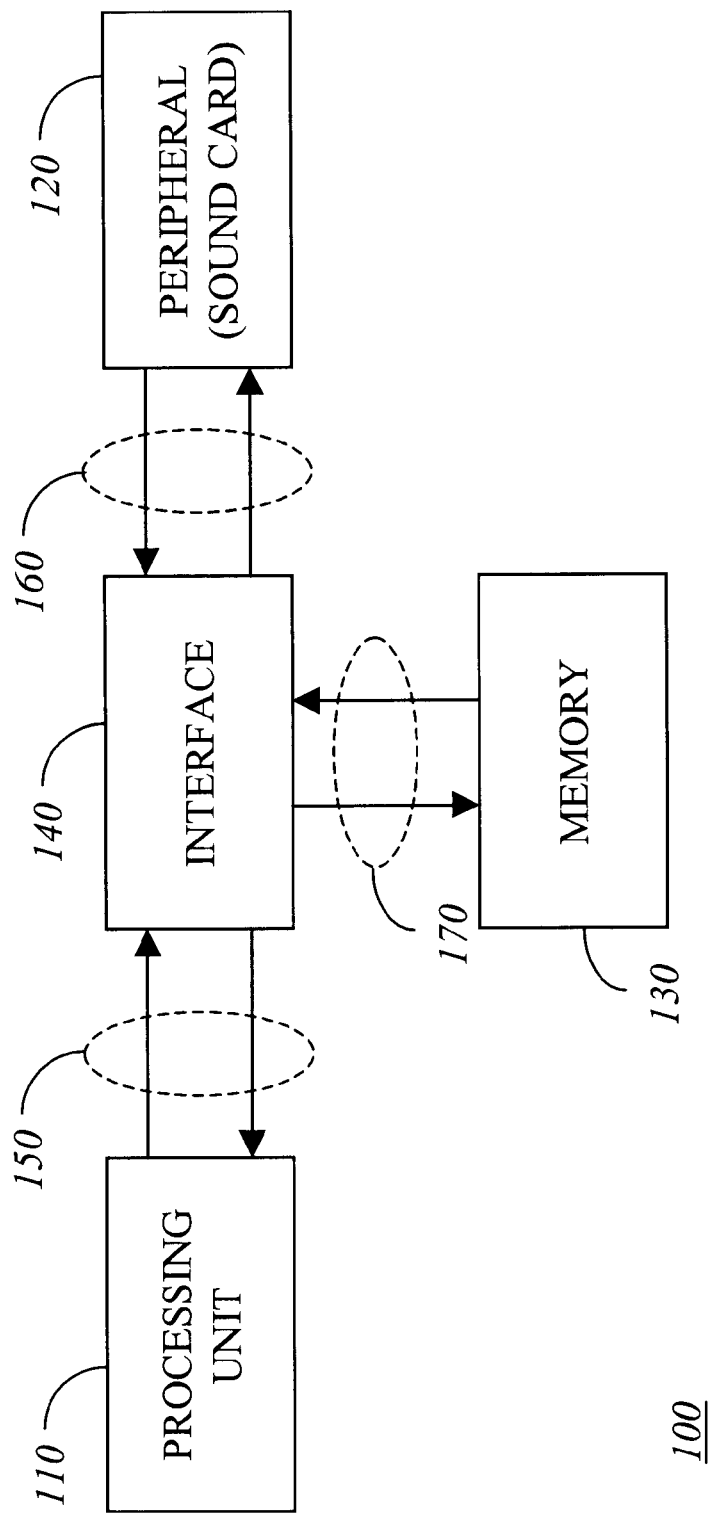
FIG. 1 is an illustrative block diagram of an embodiment of a digital platform using standard hardware to produce random number generation.

Referring now to FIG. 1, an illustrative block diagram of an embodiment of a digital platform using standard hardware for random number generation is shown. Digital platform 100 includes a processing unit 110, a peripheral 120 and memory 130, all of which being coupled together by interface logic 140 and buses 150, 160 and 170. In particular, processing unit 110 is any hardware having code processing capabilities such as, for example, a central processing unit, a micro-controller, a coprocessor, a state machine and the like. Peripheral 120 includes a sound card, modem card, a network card, a hard disk, a camera for digital platform 100, a keyboard or any other hardware capable of providing noise source data to processing unit 110.

As shown, peripheral 120 includes a sound card typically implemented in most legacy digital platforms and apparently in digital platforms scheduled for future release. When digital platform 100 is powered, peripheral 120 provides noise source data to processing unit 110. In this example, when sampled, noise source data comprises a series of data bytes; however, the data may be sampled according to other size constraints besides bytes such as, for example, nibbles, words, double words (dwords) or any other $2^n$-bit configuration. The noise source data is converted to a random data stream, normally with some bias, using both a run-length coding scheme and a run count coding scheme described below. After bias is removed by processing unit 110, a statistically random data stream is produced.

Figure 2:
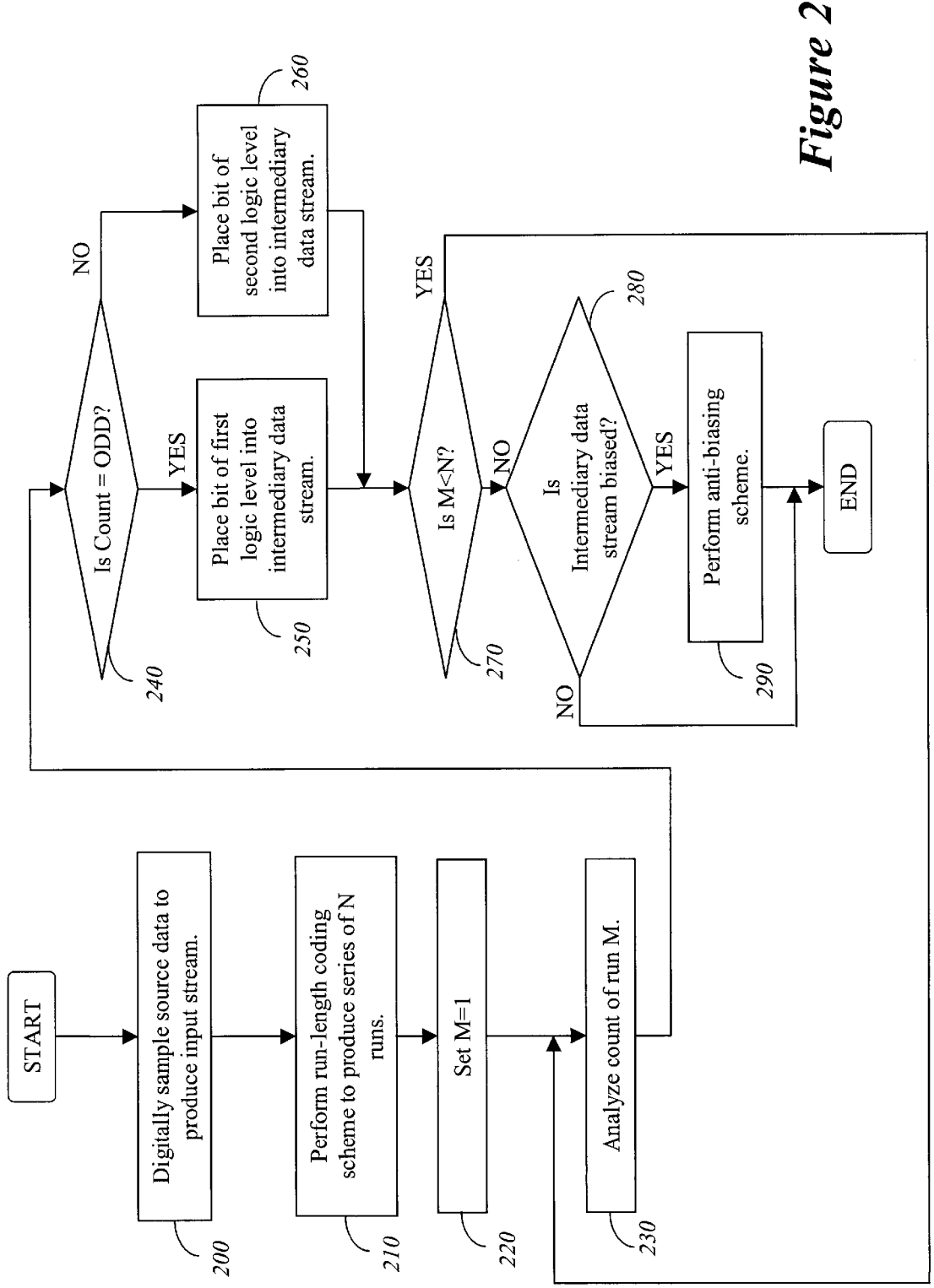
FIG. 2 is an illustrative flowchart of the acts performed by the digital platform of FIG. 1 in order to produce a random data stream from source data.

Referring now to FIG. 2, an illustrative flowchart of the acts performed by digital platform 100 of FIG. 1 in order to produce a random data stream is shown. Initially, the source data is digitally sampled to produce an input stream of bits forming a series of random numbers (block 200). A run-length coding scheme is performed on this input bit stream over a selected sampling size constraint (e.g., for each byte as shown in FIGS. 7A–7C) in order to compress the input bit stream and produce a series of N runs where "N" is a positive whole number (block 210). Each run comprises a count and a pattern value. The "pattern value" comprises a coded value of a bit pattern for the particular run. The "count" indicates the number of times that the bit pattern was consecutively repeated before encountering a different bit pattern.

For each run, a ran-count coding scheme is performed. More specifically, for each run, the count is analyzed to determine whether the number of repetitions of the bit pattern associated with the run is an odd or even number (blocks 220, 230 and 240). If the count is an odd number, a bit having a first logic level (e.g., logic low) is placed into an intermediary data stream so as to represent that run (block 250). Otherwise, a bit having a second logic level (e.g., logic high) is placed into the intermediary data stream (block 260). This process continues for each run associated with the input bit stream (block 270).

Thereafter, a determination is made whether the intermediary data stream is biased (block 280). The determination is performed by analyzing the logic level for each bit or perhaps a certain grouping of bits of the intermediary data stream to determine whether or not the distribution of logic low values and logic high values are substantially equivalent. For example, if the standard deviation of logic low and high values is greater than a predetermined factor, the data stream is biased. If the intermediary data stream is biased, an anti-biasing scheme may be performed thereon as described in FIGS. 3–6 (block 290). Otherwise, the unbiased, random data stream is available.

Figure 3:
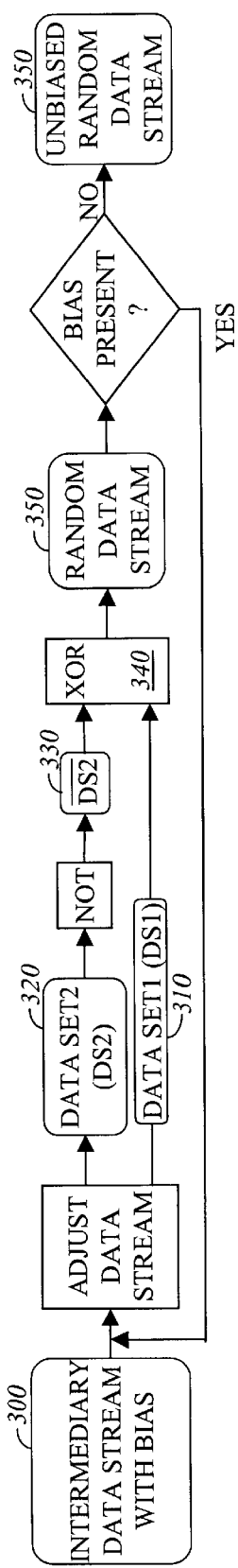
FIG. 3 is an illustrative block diagram of a first embodiment of the anti-biasing scheme as set forth in FIG. 2.

Referring now to FIG. 3, an illustrative block diagram of a first embodiment of the anti-biasing scheme is shown. First, for this embodiment, intermediary data stream 300 is separated into a first data set 310 and a second data set 320. Any number of bit manipulations may be used to perform the separation. For example, a first half of intermediary data stream 300 may correspond to first data set 310 while the remaining bits of intermediary data stream 300 correspond to second data set 320. Of course, other degrees of separation may be used in which only a portion of intermediary data stream 300 is analyzed in lieu of the entire data stream 300. As one alternative, a portion (smaller than one-half) of intermediary data stream 300 would correspond to first data set 310 while a second portion, normally equal to the first portion, would correspond to second data set 320.

According to any degree of separation chosen, first and second data sets 310 and 320 are produced, a bit-wise complement 330 of second data set 320 is produced. More specifically, complement data set 330 may be produced by routing second data set 320 into circuitry configured to alter the logic level of each bit of second data set 320. This circuitry may be implemented as one or more inverters in parallel or other combinatorial logic arranged to operate as an inverter. Of course, complement data set 330 may be produced by processing unit 110 (of FIG. 1) executing software coded to perform the bit-wise complement of second data set 320.

Thereafter, first data set 310 and complement data set 330 are bit-wise, exclusive-OR'ed (XOR'ed) 340 to produce a resultant, random data stream 350. In the event that random data stream 350 is still biased, random data stream 350 is separated into first data set 310 and second data set 320 and the anti-biasing scheme is reiterated. However, if determined to be unbiased, random data stream 350 is statistically random and may be used for data security or any other chosen purpose.

Figure 4:
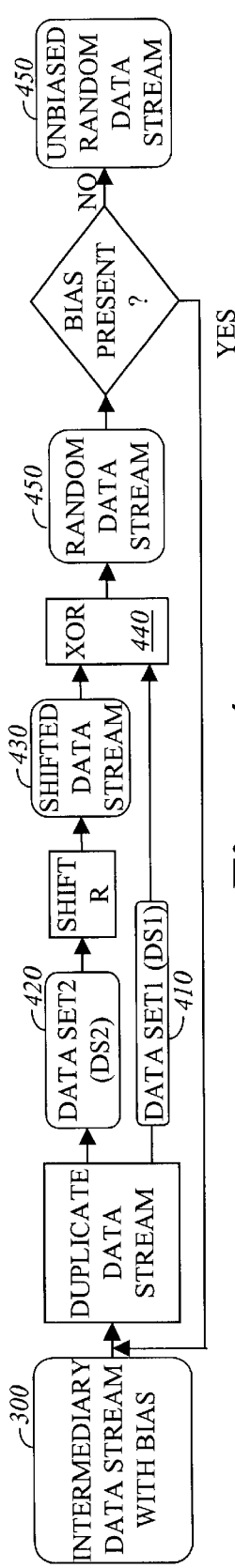
FIG. 4 is an illustrative block diagram of a second embodiment of the anti-biasing scheme as set forth in FIG. 2.

Referring to FIG. 4, an illustrative block diagram of a second embodiment of the anti-biasing scheme is shown. For this embodiment, intermediary data stream 300 is duplicated to produce a first version of the intermediary data stream ("first data stream") 410 and a second version of the intermediary data stream ("second data stream") 420. Both first data stream 410 and second data stream 420 are identical to intermediary data stream 300. Thereafter, second data stream 420 undergoes a bit shift (e.g., one bit to the right) to produce a shifted data stream 430. First data stream 410 and shifted data stream 430 are bit-wise XOR'ed 440 to produce a resultant, random data stream 450. In the event that random data stream 450 is still biased, random data stream 450 is duplicated and this anti-biasing scheme is repeated. However, if determined to be unbiased, random data stream 450 is statistically random.

Figure 5:
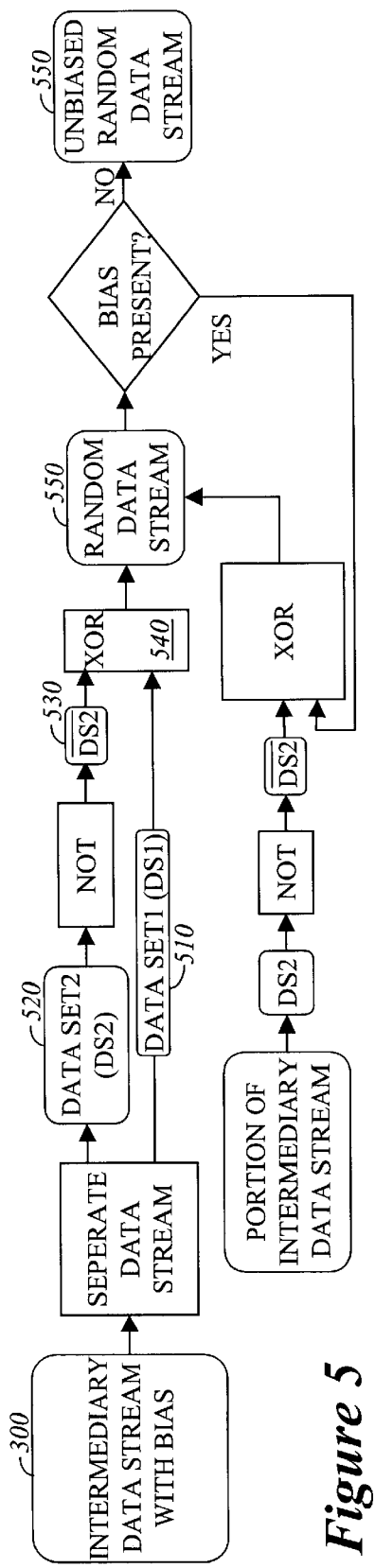
FIG. 5 is an illustrative block diagram of a third embodiment of the anti-biasing scheme as set forth in FIG. 2.

Referring to FIG. 5, an illustrative block diagram of a third embodiment of the anti-biasing scheme is shown. For this embodiment, intermediary data stream 300 is separated (in its entirety or chosen grouping thereof) into a first data set 510 and a second data set 520. After first and second data sets 510 and 520 are produced, a bit-wise complement 530 of second data set 520 is produced. First data set 510 and complement data set 530 are bit-wise XOR'ed 540 to produce random data stream 550. In the event that random data stream 550 is still biased, random data stream 550 is reloaded as first data set 510 while second data set 520 is loaded with a selected portion of intermediary data stream 300 normally (but not necessarily) the same size as first data set 510. This portion may be any selected grouping from intermediary data stream 300. Thereafter, this anti-biasing scheme is repeated until the resultant random data stream 550 is unbiased.

Figure 6:
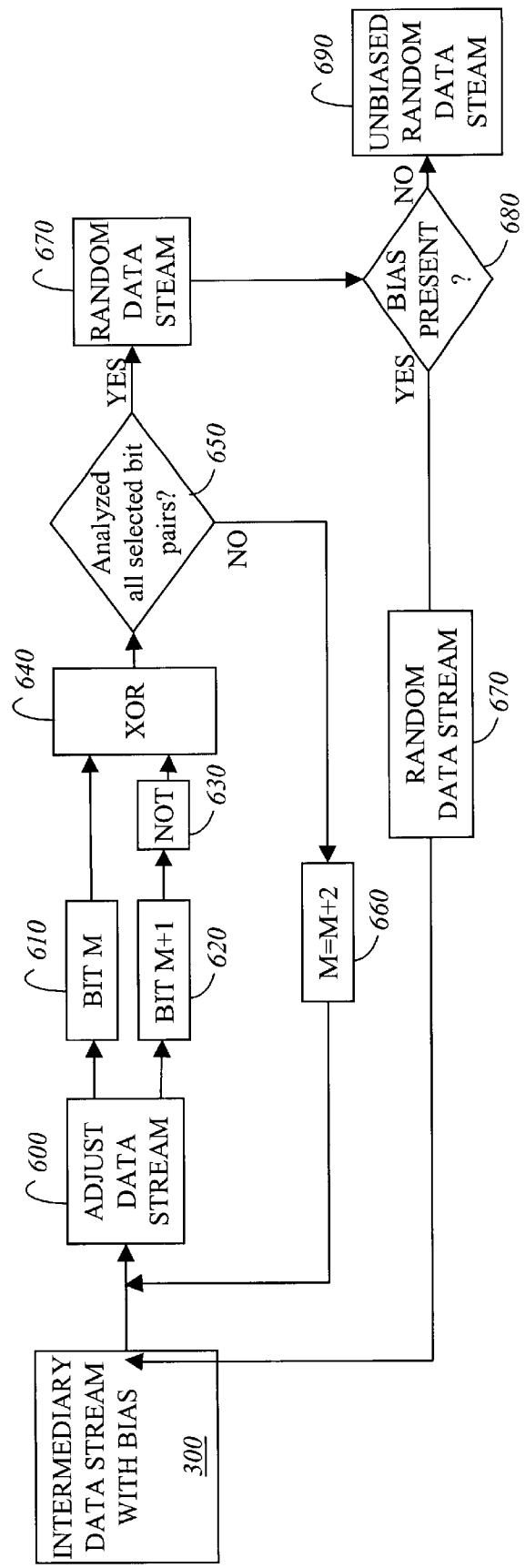
FIG. 6 is an illustrative block diagram of a fourth embodiment of the anti-biasing scheme as set forth in FIG. 2.

Referring now to FIG. 6, an illustrative block diagram of a fourth embodiment of the anti-biasing scheme is shown. For this embodiment, in general, alternative bits of intermediary data stream 300 are XOR'ed to produce a resultant data stream 670. As a result, a large amount of memory is not needed to store a substantial number of bits associated with each data set as set forth in FIGS. 3–5. This anti-biasing scheme would be useful for digital platforms with limited or constrained storage capabilities.

As shown, formed from count values associated with N runs, intermediary data stream 300 is received. Logic or software 600 is used to adjust data stream 300 so that consecutive pairs of bits throughout the entire data stream 300 (or portion thereof) are operated on in succession or concurrently, Namely, bit M (M=1 for the first bit of data stream 300) is XOR'ed with a complement of bit M+1 as shown in blocks 610, 620, 630 and 640. Of course, as an alternative, the complement operation may be performed on bit M 610 in lieu of bit M+1 620.

When all of the consecutive bit pairs of incoming data (e.g., the entire data stream of N bits or a portion thereof) have undergone analysis (e.g., XOR operations), a resultant random data stream 670 is produced. Otherwise, as shown in blocks 650 and 660, the next consecutive bit pair undergoes the complement and XOR operations. As shown in block 680, in the event that random data stream 670 is still biased, the anti-biasing scheme is reiterated in which random data stream 670 acts as an original incoming data ($\mu=\phi$) and consecutive bit pairs of random data stream 670 are analyzed. However, if determined to be unbiased, random data stream 670 is statistically random.

Referring now to FIGS. 7A–7C, an illustrative example of the run-length coding scheme, the run-count coding scheme and the first embodiment of the anti-biasing scheme is shown for clarity sake. Source data is digitally sampled to produce an input data stream 700 sampled as bytes for example. The run-length coding scheme is performed on input data stream 700 by determining the number of runs 710 therein. In this embodiment, a unique random number (represented by a bit pattern) between different random numbers or multiple random numbers duplicated in succession constitute a "run". For example, a first run $710_1$ is associated with two repeated random numbers (FFH or bytes "255") while a second run $710_2$ is associated with three repeated random numbers (10H or bytes "16"). Each run 710 may be represented through a pattern value 720 and a count 730. For first run $710_1$, pattern value 720 represents the bit pattern of the random number (FFH) while count 730 indicates that the random number was duplicated for run $710_1$.

As shown in FIG. 7B, each count 730 for runs 710 is analyzed to determine whether its value is an odd or even number. As shown, count values for runs $710_1$–$710_8$ are defined as follows: even, odd, even, odd, even, even, even, and odd. Thus, the corresponding portion of intermediary data stream 740 includes "10101110". Thereafter, a determination is made whether intermediary data stream 740 is biased by analyzing the logic levels of its bits to determine whether or not there is generally an equal distribution of "1"s and "0"s. The percentage of deviation from an equal distribution is selected by the user (e.g., 2% deviation) but another deviation may be used. If intermediary data stream 740 is biased, a selected anti-biasing scheme is performed.

As further shown in FIG. 7B, intermediary data stream 740 is separated into a first data set 750 and a second data set 760. In this embodiment, the first half of intermediary data stream 740 corresponds to first data set 750 while the remaining bits of intermediary data stream 740 correspond to second data set 760. A bit-wise complement 770 of second data set 760 is produced for subsequent XOR'ing with first data set 750 as shown in FIG. 7C. By performing an XOR operation on first data set 750 and the complement of second data set 770, a resultant, random data stream 780 is produced and checked for biasing. If biased, random data stream 780 undergoes either separation as first data set 750 (see FIG. 3). In the event that random data stream 780 is unbiased, random data stream 780 is statistically random and may be utilized.

Of course, the invention described herein may be designed in many different methods and using many different bit manipulation operations or different logical circuitry. While the present invention has been described in terms of various embodiments to facilitate understanding of the present invention, other embodiments may come to mind to those skilled in the art without departing from the spirit and scope of the present invention. The invention should, therefore, be measured in terms of the claims which follow.

What is claimed is:

1. A method comprising:

performing a run-length coding scheme on sampled data to produce a plurality of runs, each run having a count and a pattern value;

forming an intermediary data stream based on the count of each run of the plurality of runs; and producing a statistically random data stream by removing bias from the intermediary data stream.

2. The method of claim 1, wherein prior to performing the run-length coding scheme, the method comprises sampling source data.

3. The method of claim 1, wherein the pattern value is a coded representation of a bit pattern associated with a particular run.

4. The method of claim 3, wherein the count represents the number of times that the bit pattern has consecutively been repeated in the sampled data before encountering a different bit pattern.

5. The method of claim 1, wherein the forming of the intermediary data stream includes analyzing a count of a first run of the plurality of runs;

placing a bit of a first logic level into the intermediary data stream to represent the first run if the count is equal to an even number; and placing a bit of a second logic level into the intermediary data stream to represent the first run if the count is equal to an odd number.

6. The method of claim 5, wherein the forming of the intermediary data stream further includes analyzing a count of a second run of the plurality of runs;

placing a bit of a first logic level into the intermediary data stream to represent the second run if the count is equal to an even number; and placing a bit of a second logic level into the intermediary data stream to represent the second run if the count is equal to an odd number.

7. The method of claim 1, wherein the producing of the statistically random data stream includes separating the intermediary data stream into a first data set and a second data set;

producing a bit-wise complement of the second data set;

performing an exclusive-or (XOR) operation of the first data set and the complement second data set to produce the random data stream.

8. The method of claim 7, wherein the first data set and the second data set include data of an amount less than one-half of the intermediary data stream.

9. The method of claim 7, wherein the first data set concatenated with the second data set fails to recreate the intermediary data stream.

10. The method of claim 7, wherein the producing of the statistically random data stream further includes checking whether the random data stream is statistically random; and outputting the random data stream as the statistically random data stream if the random data stream is determined to be statistically random.

11. The method of claim 7, wherein the producing of the statistically random data stream further includes checking whether the random data stream is statistically random; and separating the random data stream into a first data set and a second data set if the random data stream is determined not to be statistically random;

producing a bit-wise complement of the second data set;

performing an exclusive-or (XOR) operation of the first data set and the complement second data set to produce a second version of the random data stream.

12. The method of claim 11, wherein the producing of the statistically random data stream further includes checking whether the second version of the random data stream is statistically random; and outputting the second version of the random data stream as the statistically random data stream if the second version of the random data stream is determined to be statistically random.

13. The method of claim 1, wherein the producing of the statistically random data stream includes duplicating the intermediary data stream into a first version of the intermediary data stream and a second version of the intermediary data stream;

performing a right bit shift on the second version of the intermediary data stream to produce a shifted data stream;

performing an exclusive-or (XOR) operation of the first version of the intermediary data stream and the shifted data stream.

14. The method of claim 13, wherein the producing of the statistically random data stream further includes checking whether a resultant data stream from the XOR operation is statistically random; and outputting the resultant data stream as the statistically random data stream if the resultant data stream is determined to be statistically random.

15. The method of claim 13, wherein the producing of the statistically random data stream further includes checking whether a resultant data stream from the XOR operation is statistically random;

duplicating the resultant data stream into a first version of the resultant data stream and a second version of the resultant data stream;

performing a right bit shift on the second version of the resultant data stream to produce a shifted resultant data stream; and performing a second exclusive-or (XOR) operation of the first version of the resultant data stream and the shifted resultant data stream.

16. The method of claim 14, wherein the producing of the statistically random data stream further includes checking whether a resultant data stream from the second XOR operation is statistically random; and outputting the resultant data stream from the second XOR operation as the statistically random data stream if determined to be statistically random.

17. The method of claim 1, wherein the producing of the statistically random data stream includes (a) separating the intermediary data stream into a first data set and a second data set;

(b) producing a bit-wise complement of the second data set;

(c) performing an exclusive-or (XOR) operation of the first data set and the complement second data set to produce a resultant data stream;

(d) checking whether the resultant data stream is statistically random;

(e) outputting the resultant data stream as the statistically random data stream if the resultant data stream is determined to be statistically random;

(f) providing the resultant data stream as the first data set and a selected portion of the intermediary data stream as the second data set and repeating operations (b)–(d) if the resultant data stream is determined not to be statistically random.

18. A method comprising:

(a) performing a run-length coding scheme on sampled data to produce a plurality of runs, each run having a count and a pattern value;

(b) analyzing a count of a first run of the plurality of runs;

(c) placing a bit of a first logic level into an intermediary data stream if the count is equal to an even number;

(d) placing a bit of a second logic level into the intermediary data stream if the count is equal to an odd number;

(e) repeating operations (b)–(d) for each remaining run of the plurality of runs.

19. The method of claim 18 further comprising:

determining whether the intermediary data stream is biased; and removing bias from the intermediary data stream to produce a statistically random data stream if the intermediary data stream is determined to be biased.

20. The method of claim 19 further comprising:

providing the intermediary data stream as the statistically random data stream if the intermediary data stream is determined to be unbiased.

21. A machine readable medium having embodied thereon a computer program for processing by a digital platform including memory containing the computer program comprising:

an run-time encoding function to convert sampled data into a plurality of runs each including a count and a pattern value;

a run-count encoding function to produce an intermediary data stream based on the count of each run of the plurality of runs; and an anti-biasing function to produce a statistically random data stream by removing bias from the intermediary data stream.

22. A digital platform comprising:

a peripheral to produce noise source data; and a processing unit coupled to the peripheral, the processing unit to produce a statistically random data stream based on the noise source data provided by the peripheral by (i) sampling the noise source data, (ii) performing a run-length coding scheme on the sampled data to produce a plurality of runs each having a count and a pattern value, (iii) forming an intermediary data stream based on the count of each run of the plurality of runs, and (iv) producing the statistically random data stream by removing bias from the intermediary data stream if needed.

23. The digital platform of claim 22, wherein the peripheral is a sound card.

24. The digital platform of claim 22, wherein the peripheral is a modem card.

25. The digital platform of claim 22, wherein the peripheral is a network card.

26. The digital platform of claim 22, wherein the peripheral is a hard disk drive.

27. The digital platform of claim 22, wherein the processing unit to sample the noise source data, to recover a count for runs produced by a run-length scheme where the counts produce an intermediary data stream, and to produce the statistically random data stream by removing bias from the intermediary data stream.

* * * * *